(12) United States Patent
Gattiker et al.

(10) Patent No.: US 8,595,665 B2
(45) Date of Patent: Nov. 26, 2013

(54) GUIDING DESIGN ACTIONS FOR COMPLEX FAILURE MODES

(75) Inventors: Ann Elizabeth Gattiker, Austin, TX (US); Sani Richard Nassif, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/460,369

(22) Filed: Apr. 30, 2012

(65) Prior Publication Data

US 2013/0159947 A1    Jun. 20, 2013

Related U.S. Application Data

(63) Continuation of application No. 13/328,911, filed on Dec. 16, 2011.

(51) Int. Cl.
*G06F 17/50* (2006.01)

(52) U.S. Cl.
USPC ............................ 716/111; 716/132; 716/136

(58) Field of Classification Search
USPC .......................................... 716/111, 132, 136
See application file for complete search history.

(56) References Cited

U.S. PATENT DOCUMENTS

| | | | |
|---|---|---|---|
| 7,137,080 B2 * | 11/2006 | Acar et al. | 716/109 |
| 7,380,225 B2 | 5/2008 | Joshi et al. | |
| 8,365,118 B2 * | 1/2013 | Joshi et al. | 716/111 |
| 2010/0153086 A1 | 6/2010 | Saton | |
| 2010/0235109 A1 | 9/2010 | Zhao et al. | |
| 2011/0153536 A1 | 6/2011 | Yang et al. | |
| 2012/0290261 A1 * | 11/2012 | Genta | 702/179 |

FOREIGN PATENT DOCUMENTS

WO    2011078965 A1    6/2011

OTHER PUBLICATIONS

Kanj et al., "Mixture Importance Sampling and Its Application to the Analysis of SRAM Designs in the Presence of Rare Failure Events", DAC 2006, Jul. 24-28, 2006, San Francisco, CA.
Singhee, "Novel Algorithms for Fast Statistical Analysis of Scaled Circuits," Ph. D. thesis, Carnegie Institute of Technology, Carnegie Mellon University, 2007.
Brereton et al., "Fitting Mixture Importance Sampling Distributions via Improved Cross-Entropy," Proceedings of the 2011 Winter Simulation Conference.
McConaghy, Sumbolic Density Models of One-in-a-Billion Statistical Tails, Genetic Programming Theory and Practice VIII, 2011—Springer.
Dolecek et al., "Breakig the Simulation Barrier: SRAM Evaluation Through Norm Mimization," ICCAD 2008.
Katayama et al., "Sequential Importance Sampling for Low-Probability and High-Deimensional SRAM Yield Analysis", International Conference on Computer-Aided Design (ICCAD), 2010 IEEE/ACM.

* cited by examiner

*Primary Examiner* — Thuan Do
(74) *Attorney, Agent, or Firm* — Garg Law Firm, PLLC; Rakesh Garg; John Flynn

(57) ABSTRACT

A method for guiding design actions for complex failure modes in an integrated circuit (IC) design is provided in the illustrative embodiments. A probability of failure estimate of a circuit according to the IC design is received, the probability being determined using a simulation. A sensitivity of the probability of failure to a variable associated with a component in the circuit is calculated, wherein the sensitivity is determined by an estimation without the simulation. The sensitivity is depicted relative to the component in the IC design such that the sensitivity is associated with the component and a visual relationship between the component and the sensitivity is usable for adjusting a characteristic of the component to reduce the probability of failure of the circuit.

7 Claims, 9 Drawing Sheets

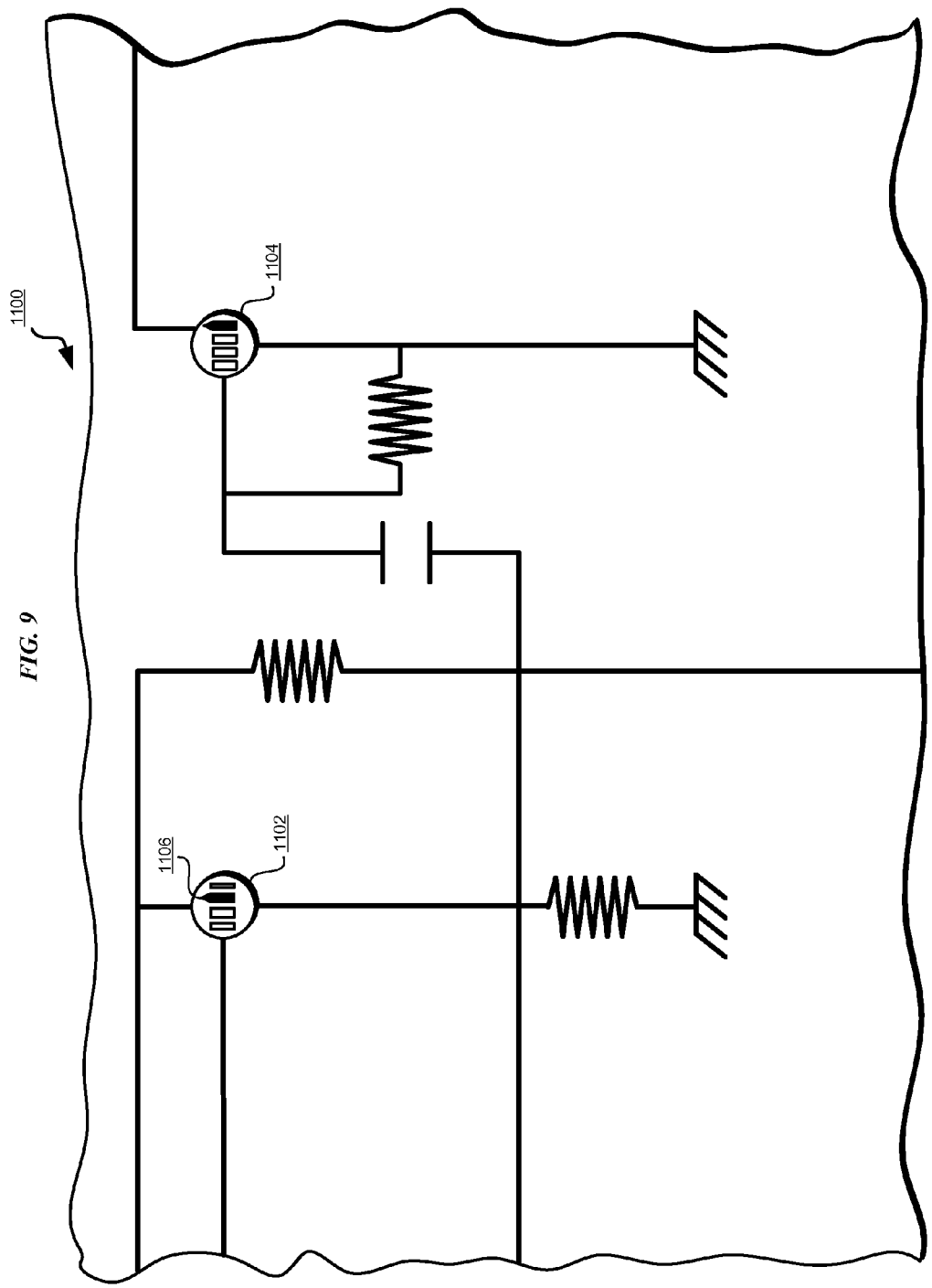

GUIDING DESIGN ACTIONS FOR COMPLEX FAILURE MODES

The present application is a CONTINUATION of copending patent application Ser. No. 13/328,911.

RELATED APPLICATION

The present invention is related to similar subject matter of co-pending and commonly assigned U.S. patent application Ser. No. 13/325,244 entitled "VISUALIZING SENSITIVITY INFORMATION IN INTEGRATED CIRCUIT DESIGN," filed on Dec. 14, 2011, and U.S. patent application Ser. No. 12/859,871 entitled "STATISTICAL DESIGN WITH IMPORTANCE SAMPLING REUSE," filed on Aug. 20, 2010, which are hereby incorporated by reference.

TECHNICAL FIELD

The present invention relates generally to a computer implemented method for integrated circuit (IC) design. Particularly, the present invention relates to a computer implemented method for guiding design change actions based on efficiently detecting the sensitivities in certain failure modes in complex circuits.

BACKGROUND

Modern day electronics include components that use integrated circuits. Integrated circuits, commonly known as "chips" are electronic circuits formed using Silicon as a substrate and by adding impurities to form solid-state electronic devices, such as transistors, diodes, and resistors.

Circuit designers use a variety of software tools to design electronic circuits that accomplish an intended task. The software tools used for designing ICs produce, manipulate, or otherwise work with the circuit layout at very small scales. Some of the components that such a tool may manipulate may only measure tens of nanometer across when formed in Silicon. The designs produced and manipulated using these software tools are complex, often including millions of such components interconnected to form an intended electronic circuitry.

A threshold voltage is a voltage required to operate a component in a circuit. For example, a metal oxide field effect transistor (MOSFET) has a gate that operates at a threshold voltage. When the threshold voltage or a higher voltage is applied to the gate the MOSFET is turned on and provides a conductive path. When the voltage applied to the gate is below the threshold voltage the MOSFET is turned off.

Once a design layout (layout) has been finalized for an IC, the design is converted into a set of masks or reticles for photolithography. A layout includes shapes that the designer selects and positions to achieve a design function.

A common component on chips is memory. Memory consists of an array of bit cells, each capable of storing a single bit (true/false) value. Chip performance is heavily dependent on the amount of memory placed on the chip, hence there is advancement in chip design for ever increasing memory arrays. Bit cells can fail, however, due to manufacturing variations in parameters such as the threshold voltage. In order to make a working array, these bit fail rates have to be very small. Techniques exist for estimating the cell failure rate of a memory array design. The number of defective devices, or device yield loss, is related to the cell failure rate. For example, in order to achieve a yield of ninety percent in a one-million cell array without redundancy, a failure rate below one in five million must be held.

Another common component on chips is latches. Latches are similar to memory bit cells, and a large number of them exist on a given chip. Latch failure rates must also be kept very low in order to insure overall functionality. The traditional method of choice for assessing such failure rates is the Monte Carlo method.

Techniques such as Monte Carlo analysis produce accurate results at a cost of a large number of simulations, due to the random sampling of the entire probability space of the variables that are treated in the analysis. As the circuit failure rate decreases, the number of samples required for accurate analysis becomes increasingly large, because of the relatively sparse distribution of samples in the distribution tail(s) that correspond to failed circuits.

Monte Carlo simulation is a tool for understanding the statistical behavior of complex systems. The effect of circuit changes are difficult to estimate at very low failure rate levels, therefore, low failure rates cause further complications for adjusting designs to achieve the best result. However, Monte Carlo simulation becomes inefficient when one needs to study behavior in the tails of the input distributions. Because such rare event simulation is important for understanding many circuit behaviors, importance sampling methods have been developed to explore the tail regions. One such method, mixture importance sampling, is used for simulation of memory cells, which are simpler circuits with fewer variables than other types of more complex circuits.

SUMMARY

An embodiment provides a method for guiding design actions for complex failure modes in an integrated circuit (IC) design.

BRIEF DESCRIPTION OF THE SEVERAL VIEWS OF THE DRAWINGS

The novel features believed characteristic of the embodiments are set forth in the appended claims. An embodiment of the invention itself, however, as well as a preferred mode of use, further objectives and advantages thereof, will best be understood by reference to the following detailed description of an illustrative embodiment when read in conjunction with the accompanying drawings, wherein:

FIG. 9 depicts an example manner of visualizing sensitivity information in an IC design in accordance with an illustrative embodiment.

DETAILED DESCRIPTION

Figure 1:
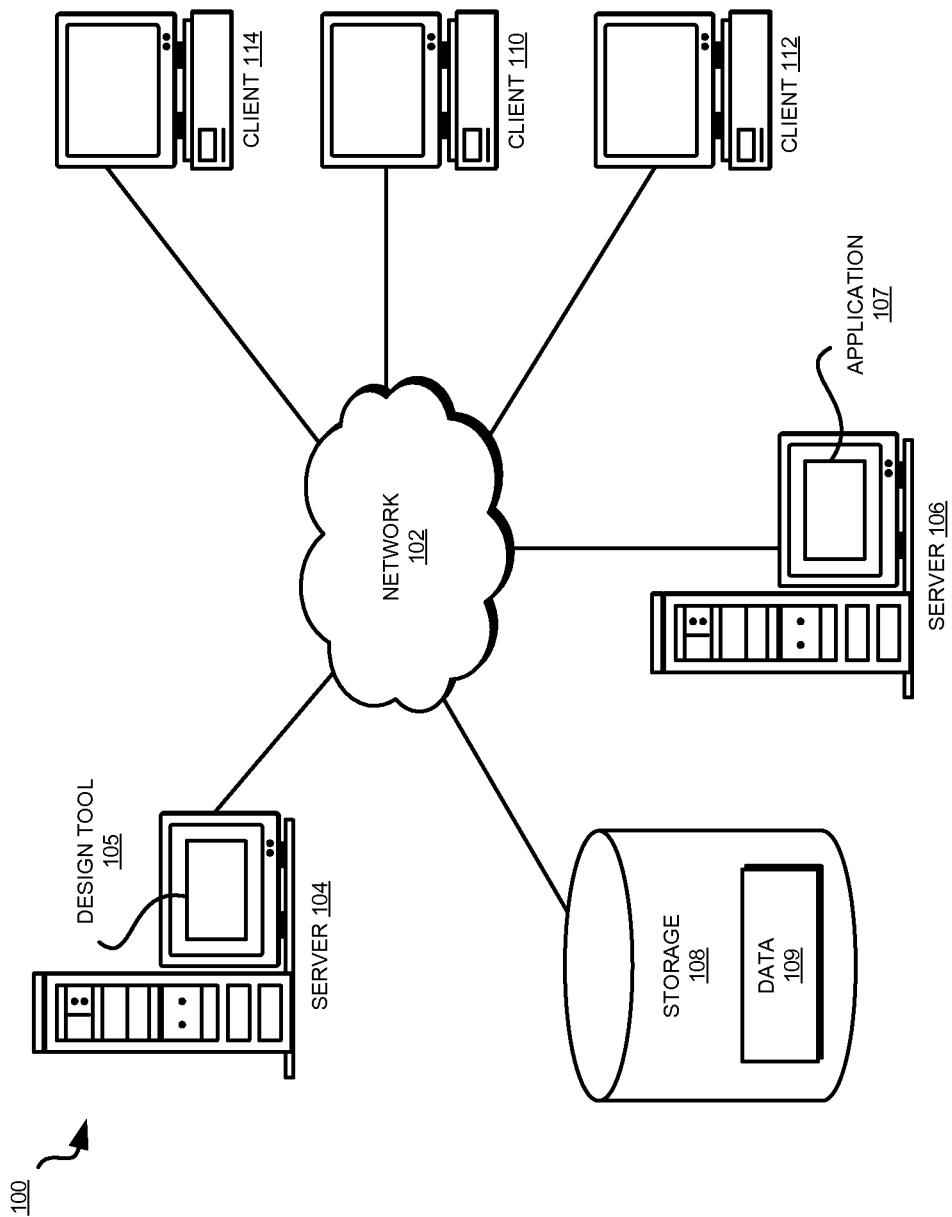
FIG. 1 depicts a pictorial representation of a network of data processing systems in which illustrative embodiments may be implemented.

Some circuits can have more complex failure modes that are harder to anticipate and understand versus memories. The illustrative embodiments recognize that it is desirable for such systems to have a method of determining the sensitivities of the system's failure probability relative to the input variables. The illustrative embodiments further recognize that such a method should not only determine these sensitivities, but also guide corrective action in the design of the circuit based upon those sensitivities.

One current practice involves changing values of input variables and re-running the Monte Carlo simulations to get a new probability of failure. The illustrative embodiments recognize that such an approach to determining sensitivities is time-consuming and computationally expensive.

Another current practice uses the expected value of fails in the uniform sampling step of the 2-step mixture importance sampling procedure as a measure of "importance." The illustrative embodiments recognize, however, that with a large number of input variables, it is very difficult to determine from those values the sensitivity of the results to each variable. For example, with these current practices, an effect of a combination of variables considered together on a probability of failure of a design component is extremely difficult to estimate.

Thus, the illustrative embodiments recognize that while techniques, such as Monte Carlo simulation may be used for determining sensitivities involving a small number of design components, such as in memory designs, these techniques are increasingly inefficient and difficult to use for problems pertaining to more complex circuit designs, such as the design of buffers driving latches. The illustrative embodiments further recognize that using these techniques, more complex failure modes, such as a failure caused when a certain combination of inputs is present, are much harder to anticipate and understand for designs more complex than memory arrays.

The illustrative embodiments recognize that a need exists for guiding a circuit designer to the appropriate component in the design that should be modified or manipulated to address a particular sensitivity. The illustrative embodiments further recognize that such correlation is particularly important when the sensitivities arise in rare failure modes, in complex circuits, or a combination thereof.

The illustrative embodiments recognize that a more efficient manner of presenting the sensitivity data is desirable. The illustrative embodiments further recognize that the presentation of the sensitivity data has to be correlated with the corresponding components such that the sensitivity data is comprehensible and usable at the design stage.

The illustrative embodiments used to describe the invention generally address and solve the above-described problems and other problems related to determining the sensitivities information for failure modes involving the tails of the input distributions for complex integrated circuits. The illustrative embodiments provide a method for guiding design change actions based on efficiently detecting the sensitivities in certain failure modes in complex circuits.

The illustrative embodiments are described with respect to certain devices or components only as examples. Such descriptions are not intended to be limiting on the illustrative embodiments. For example, an illustrative embodiment described with respect to a transistor can be implemented using a capacitor in an integrated circuit within the scope of the illustrative embodiments.

Similarly, the illustrative embodiments are described with respect to certain sensitivity data (sensitivity information) and visual renderings only as examples. Such descriptions are not intended to be limiting on the illustrative embodiments. For example, an illustrative embodiment described with respect to certain icons, graphics, or images having certain colors, shapes, sizes, or orientations can be implemented using other visual artifacts for a similar purpose, including but not limited to graphical, textual, audible, and tactile artifacts, within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the embodiments of the invention.

The illustrative embodiments are further described with respect to certain applications only as examples. Such descriptions are not intended to be limiting on the embodiments of the invention. An embodiment of the invention may be implemented with respect to any type of application, such as, for example, applications that are served, the instances of any type of server application, a platform application, a standalone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which an embodiment of the invention may be implemented. (Java and all Java-based trademarks and logos are trademarks or registered trademarks of Oracle and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, designs, architectures, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
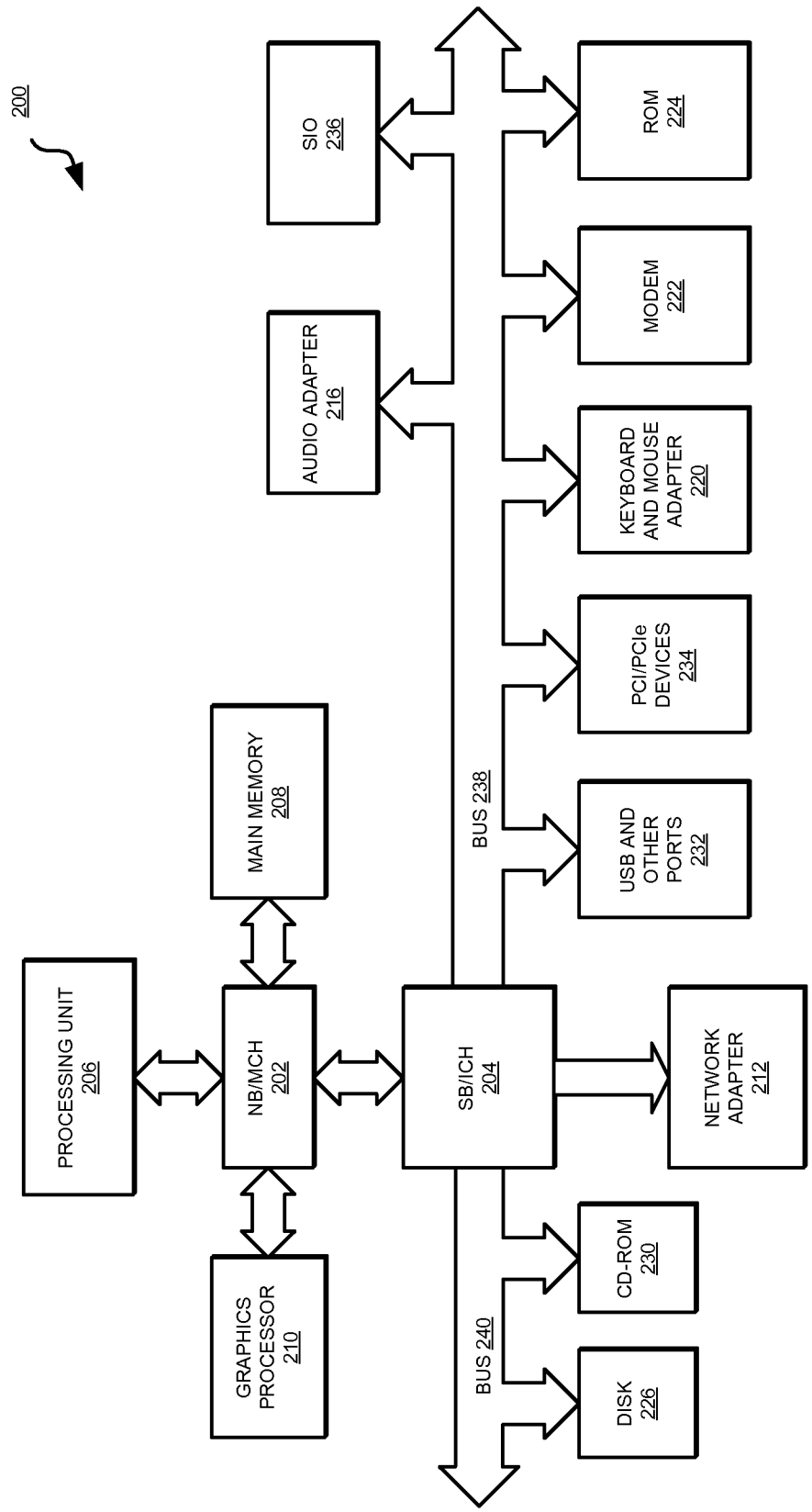
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Design tool 105 may be any suitable software application usable for manipulating a design of an IC. Data 109 may be the sensitivity information according to an embodiment. Application 107 may be an application implementing an embodiment for efficiently estimating sensitivity for certain combination of inputs, without re-executing a simulation, and presenting thus-estimated sensitivity information 109 on a design schematic in design tool 105.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

An SRAM cell is a typical memory cell, and as an example, typically includes six transistors. More complex circuits, for example, a local clock buffer (LCB) driving latch circuit includes a significantly larger number of components, e.g., hundreds of transistors. Modern ICs contain enough replicates of such circuits that "statistical yield" must be computed, i.e., the ICs are sensitive to failure that occurs when components take on parameter values that are in the tails of their probability distributions.

Furthermore, the device yield is computed for a typical IC that replicates either of these circuits many thousands times. While comprehending the effects of changes to variables affecting one of six components, as in an example SRAM cell, may not be difficult for a designer, comprehending the effects of changes to variables associated with over one hundred components is a challenging task. Furthermore, when a sensitivity is associated with a replicated circuit, such as when one circuit drives a multiplicity of identical circuits, comprehending the effects of manipulating a particular component to improve the probability of failure is an almost impossible task without the aid of an embodiment.

Thus, an illustrative embodiment is useful when determining a sensitivity in a complex circuit, determining the sensitivity to a set of inputs whose values of interest lie in the tail portions of an input distribution curve (such as in the tails of a bell curve), determining a sensitivity that is dependent on a certain rare combination of inputs, determining a sensitivity that is dependent on replication of components, or a combination thereof. Furthermore, an illustrative embodiment is useful in any of these circumstances by avoiding the re-execution of thousands of simulations, as would be necessitated if the sensitivities were to be determined by brute-force change of inputs. An embodiment estimates the sensitivity information in any of these circumstances by performing MIS and then using the results to mathematically compute the estimate of sensitivities of failure probability to designable parameters.

Figure 3:
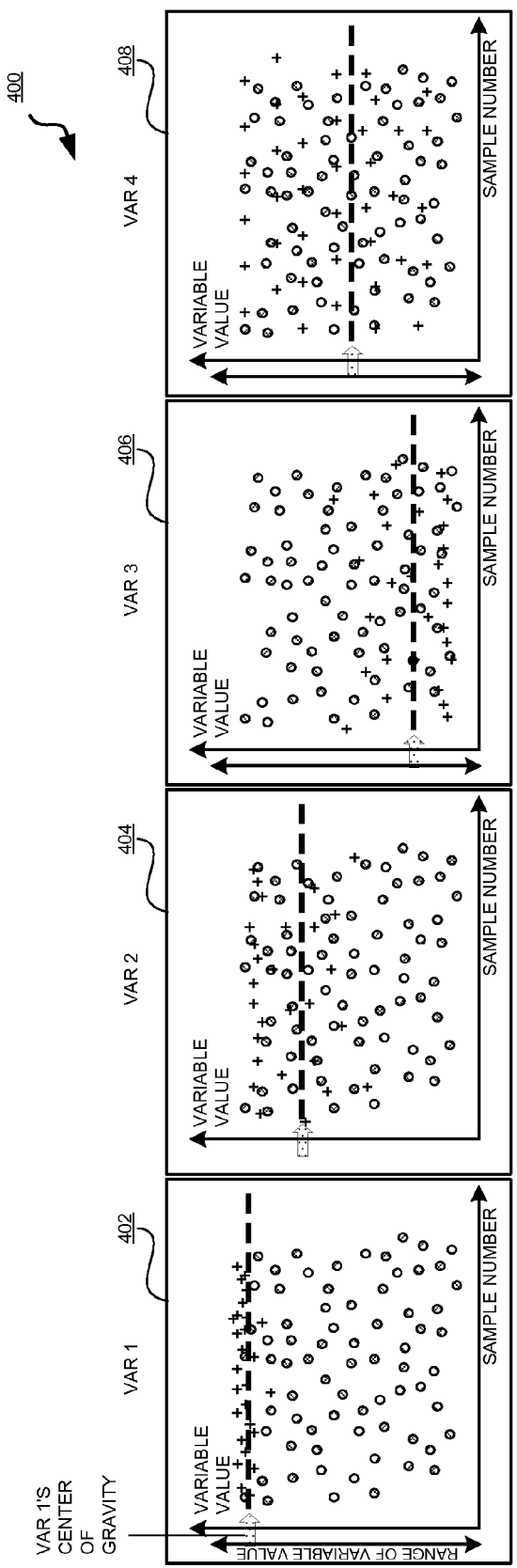
FIG. 3 depicts an example current practice using mixture ratio importance sampling technique (MIS) for determining a measure of impact of changes to a variable on the probability of failure, over which an illustrative embodiment provides an improvement when determining the impact of changes to a variable on the probability of failure for complex failure modes.

With reference to FIG. 3, this figure depicts an example current practice using mixture ratio importance sampling technique (MIS) for determining a measure of impact of changes to a variable on the probability of failure, over which an illustrative embodiment provides an improvement when determining the impact of changes to a variable on the probability of failure for complex failure modes. Each of plots 402, 404, 406, and 408 depicts failures in a circuit during simulation. As depicted on the X-axis, each plot plots the value of a single input variable, "var 1", "var 2", "var 3", and "var 4" respectively, on passing (circle) simulations and failing (plus) simulations. Results are shown for many, typically thousands to tens of thousands of iterations of the simulation.

MIS operates in two passes. In the first pass, MIS samples from a uniform distribution for each variable, and executes many iterations of the simulation to determine a pass versus fail ratio. The points depicted as plus on each plot represent a failure case. MIS calculates a mean of each variable on the failures. The mean value is called the "center of gravity" (CoG) as depicted in FIG. 3.

The CoG is a rough measure of a variable's importance to the probability of failure. For example, a CoG at one end of the input distribution (variable's value), as in plot 402 indicates that the failure probability is tightly coupled to a particular value or range of the variable. As in plot 402, the simulation iterations suggest that high values of variable 1 are correlated to the failures.

As another example, a CoG approximately in the middle of the plot, as in plot 408 indicates that the sensitivity is not particularly coupled to any particular value of the variable; in other words, the variable does not appear to be important to causing the failures. As an extreme case in plot 408, the simulation results suggest that the failure could happen for any value of variable 4, indicating that it is completely unimportant.

In the second pass, MIS samples from Gaussian distribution of each variable, centered at the corresponding CoG. The simulation is then repeated with samples from those values of the variables where most failures occur.

Figure 4:
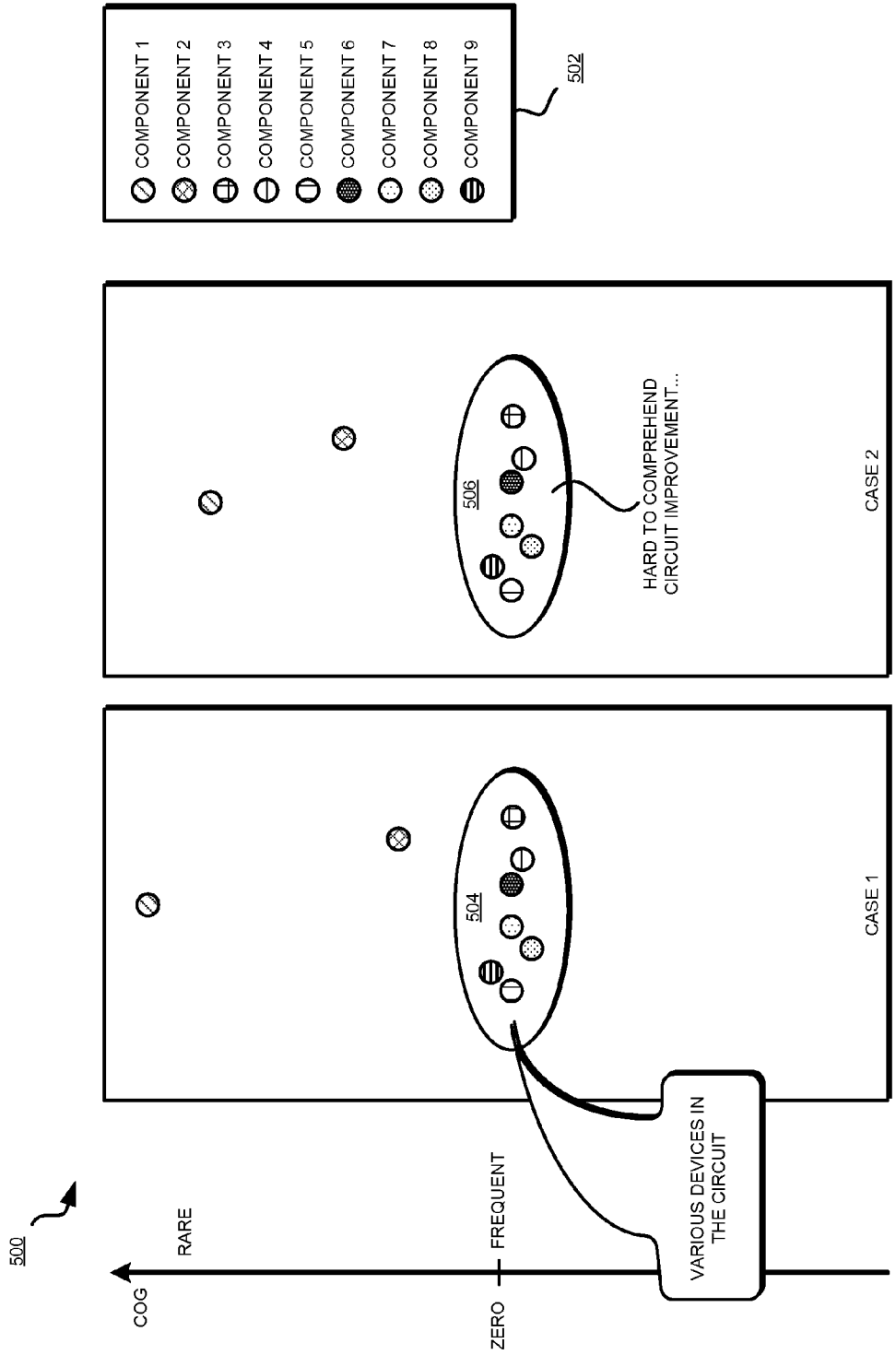
FIG. 4 depicts a graph of Center of Gravity (CoG) estimates of variable importance plotted using simulation results, which can be improved using an illustrative embodiment.

With reference to FIG. 4, this figure depicts a graph of Center of Gravity (CoG) estimates of variable importance plotted using simulation results, which can be improved using an illustrative embodiment. As an example, assume that graph 500 depicts the CoG estimates of variable importance of variables associated with nine example components depicted in legend 502. The X-axis represents the design corners at which the simulations were executed. The Y-axis represents the positions of the various CoGs, such as the CoGs of plots 402-408 in FIG. 3, relative to a datum (0). "0" on the Y-axis represents that a component's CoG is at a frequent value and therefore does not contribute strongly to failure, and significantly higher (or lower) than datum values of the CoG represent that the corresponding component strongly contributes to the failure probability.

For example, it is difficult, if not impossible, to determine whether the contribution of a particular component is important because the component may have been replicated in the circuit.

As another example, it is difficult to determine the contributions of the various components in groups 504 and 506 to the probability of failure. In other words, a designer is not guided by graph 500 as to how effective manipulation of a certain component will be for improving circuit's probability of failure at a given design corner.

Figure 5:
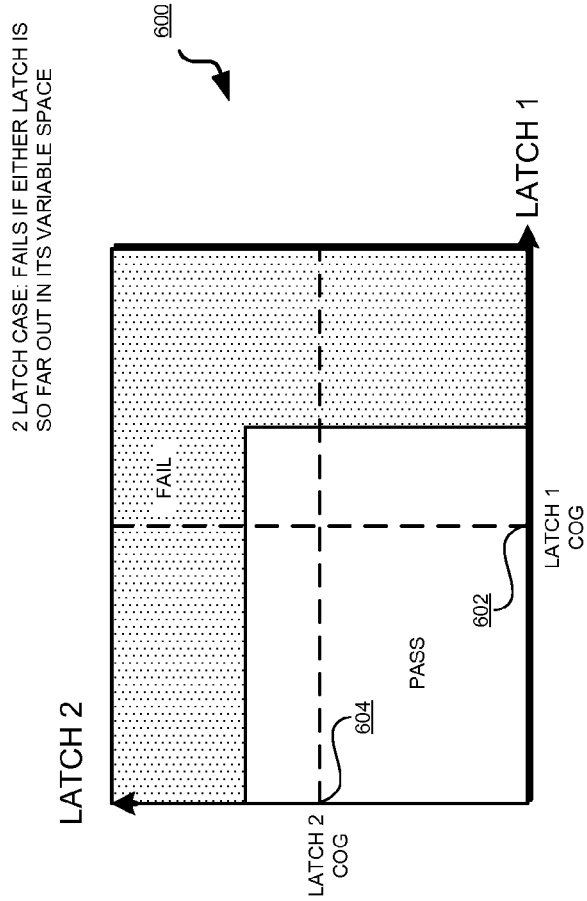
FIG. 5 depicts a graph of the problem identified by an illustrative embodiment, in identifying the magnitude of a component's contribution to probability of failure when the component participates in a replicated circuit.

With reference to FIG. 5, this figure depicts a graph of the problem identified by an illustrative embodiment, in identifying the magnitude of a component's contribution to probability of failure when the component participates in a replicated circuit. Graph 600 plots along X-axis a CoG of failures for one variable in one copy of a circuit. Graph 600 plots along Y-axis, a CoG of failures for the same variable in another copy of the circuit. Only as an example, and not as a limitation on the illustrative embodiments, the circuit is a latch in the depiction of FIG. 5, with Latch 1's CoG along the X-axis and Latch 2's CoG along the Y-axis.

Assume that the CoG of Latch 1's failures is located as shown at point 602 along the X-axis, and the CoG of Latch 2's failures is located as shown at point 604 along the Y-axis. An illustrative embodiment recognizes that considered separately, the fail cases for latch 1 may be the entire region on the x-axis right of the right rectangle boundary, and the fail cases for latch 2 may be the entire region of the y-axis above the top boundary of the rectangle boundary. However, when Latch 1 and Latch 2 are both participating in a circuit, such as when latch 1 and latch 2 are replicas of a common latch in a complex circuit, the circuit fails if either latch fails. In that case the CoG for each latch is in its pass region, which is misleading as a center of failure.

Thus, when failures in a circuit are depicted for individual instances of replicated circuits, as in the current practices, the true sensitivities of a circuit component are not apparent from knowing and plotting the pass/fail cases. Thus, MIS alone is insufficient to help a designer identify the true impact of a change to a component in replicated circuits.

Figure 6:
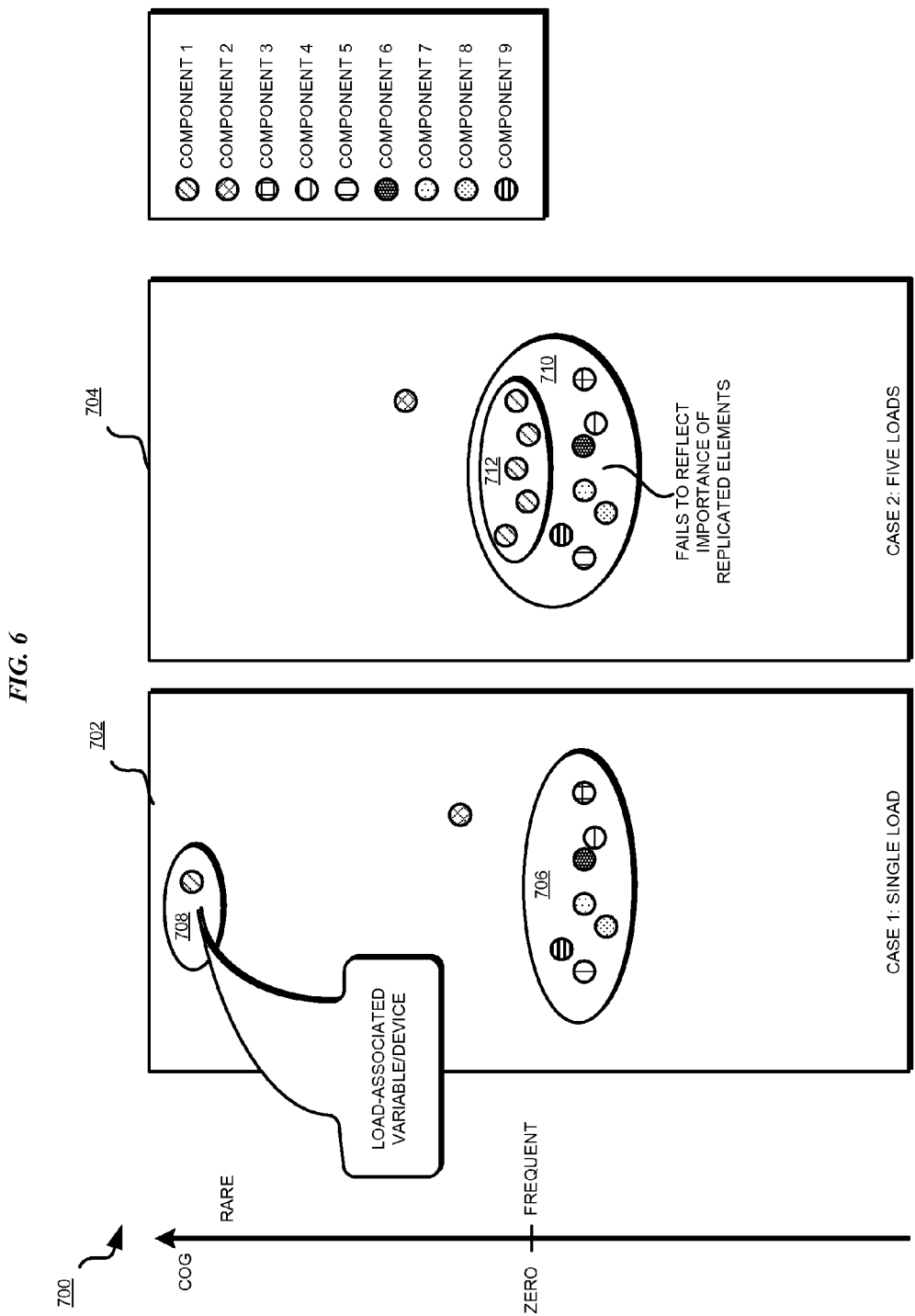
FIG. 6 depicts a graph showing a problem in determining sensitivities in replicated circuits as recognized by an illustrative embodiment.

With reference to FIG. 6, this figure depicts a graph showing a problem in determining sensitivities in replicated circuits as recognized by an illustrative embodiment. Graph 700 plots the observations supporting the depiction of graph 600 in FIG. 5, using the same legend and other artifacts as in FIG. 4.

Plot 702 depicts the CoGs of variables associated with the nine example components described in the associated graph legend. The X-axis represents one example design corner at which the simulations were executed for two design configurations. The Y-axis represents the positions of the various CoGs in the manner of FIG. 4.

Only as an example, graph 700 is plotted using a circuit where an LCB drives one or more latches. Plot 702 is a plot of the CoGs of the circuit components when the LCB drives a single latch only. Plot 704 is a plot of the CoGs of the circuit components when the LCB drives five identical latches.

Cluster 706 of CoGs in plot 702 indicates that the CoGs of several components of the single latch case are substantially around the datum. CoG 708 is a CoG of one component that is in one tail of the component's input distribution. Thus, in a single latch configuration, the component corresponding to CoG 708 is readily identified in plot 702.

However, observe cluster 710 of CoGs in plot 704, which indicates that the CoGs of several components of the five latch configuration are substantially around the datum. In a five-replica configuration, CoGs in group 712 are CoGs of the copies of the same component whose CoG 708 stands out in plot 702. In a five-replica configuration, however, where components are replicated, the CoG proxy for sensitivity is much less pronounced, and in fact lies in the same general deviation from the datum as the sensitivities of the other components. Note that the plots in FIG. 6 do not depict all plot symbols corresponding to all replicated components for the clarity of the depiction. Thus, in a replicated configuration, the impact of a certain component is much more difficult to identify than in a non-replicated configuration in plot 704, and plot 704 fails to reflect the importance of the replicated component.

An embodiment extends the statistical sampling methodology to compute analytical sensitivities. An embodiment uses these analytical sensitivities to provide guidance to a designer via depictions on a schematic in a design tool as to the relative importance of the various component sensitivities.

Furthermore, advantageously, an embodiment does not perform additional simulations to compute these analytical sensitivities. An embodiment can be configured to compute these analytical sensitivities for common or distinct variables.

In accordance with an illustrative embodiment, analytical sensitivities can be computed using a Mixture Importance Sampling (MIS) Algorithm and the described extensions for calculating sensitivities as follows—The MIS Algorithm estimates the probability of occurrence of a rare event, which is denoted by F. The event is assumed to be a function of a collection of N parameters, denoted by the N-long vector P. Each of the parameters is assumed to have a Gaussian distribution with a mean $\mu$ and a standard deviation ($\sigma$). For the $i^{th}$ parameter, $P_i=N(\mu_i, \sigma_i)$. There exists a standard function, $\Phi$, which given the mean and standard deviation, as well as a value of the corresponding parameter, will return the associated probability, i.e. $\rho_i=\Phi(P_i, \mu_i, \sigma_i)$.

The event outcome (true or false) is predicted by a function f, which has as its inputs the parameter vector P, as well as a vector of M additional case parameters, Q.

$$e=f(P,Q)$$

where e is event outcome and can be either true or false.

The MIS Algorithm is applied for different cases separately, so for notational convenience, the case parameters can be dropped from the equation since they will not vary for one run of the algorithm.

The MIS Algorithm has several distinct phases:

1. The function f is sampled over a wide range of values of the parameters P, and the resulting event outcomes are recorded. The failing samples are collected, along with the corresponding sets of parameters that caused those failing samples.

2. The "center of gravity" (CoG) of these failing parameter sets is calculated, and denoted by the vector C. If the number of failing samples is K, the $i^{th}$ component of C is calculated as: $C_i=(P_i^1+P_i^2+\ldots P_i^K)/K$ (i.e. the average of the $i^{th}$ component of all K failing points).

3. The mean (or center of distribution) of the parameters P is shifted so it will be at C. This is accomplished by setting the $i^{th}$ parameter to $P_i=N(C_i, \sigma_i)$.

4. The function f is sampled using the shifted distribution of P, and the resulting event outcomes are recorded. The failing samples are collected, along with the corresponding sets of parameters which caused those failing samples.

5. The fail probability F is then calculated by collecting the L failing samples and for each of the samples calculating an adjusted sample probability (denoted by $\theta$), and then summing the adjusted probabilities for all failing samples and dividing by the number of failing samples. For the $j^{th}$ failing sample, $P_j$, the adjusted sample probability is calculated as the product of the ratios of the probability under the shifted and un-shifted distributions for each of the N parameters: $\theta^j = \rho_1^u/\rho_1^s \rho_2^u/\rho_2^s \rho_3^u/\rho_3^s \ldots \rho_N^u/\rho_N^s$ where $\rho_i^u = \Phi(P_i^j, \mu_i, \sigma_i)$ and $\rho_i^s = \Phi(P_i^j, C_i, \sigma_i)$. Once all the $\theta^j$ are calculated, the failure probability F is calculated as $F = (\theta^1 + \theta^2 + \theta^3 + \ldots \theta^L)/L$.

The sensitivity is estimated of F to the values that define the distribution of the parameters P, namely $\mu$ and $\sigma$. The procedure for computing the sensitivity of F to the $i^{th}$ mean, $\mu_i$, is as follows—

The sensitivity of F to $\mu_i$ is the sum of the sensitivities of all L adjusted samples probabilities to $\mu_i$ divided by L. The sensitivity of the $j^{th}$ adjusted sample probability to the $i^{th}$ mean, $\mu_i$ is:

$$\text{sense}(\theta^j) = \rho_1^u/\rho_1^s \rho_2^u/\rho_2^s \ldots \text{sense}(\rho_i^u/\rho_i^s) \ldots \rho_N^u/\rho_N^s$$

and $$\text{sense}(\rho_i^u/\rho_i^s) = \text{sense}(\rho_1^u)/\rho_i^s$$

with $$\text{sense}(\rho_i^u) = \text{sense}(\Phi)(P_i^j, \mu_i, \sigma_i))$$

The sensitivity of the $j^{th}$ adjusted sample probability to the $i^{th}$ standard deviation, $\sigma_i$ is:

$$\text{sense}(\theta^j) = \rho_1^u/\rho_1^s \rho_2^u/\rho_2^s \ldots \text{sense}(\rho_i^u/\rho_i^s) \ldots \rho_N^u/\rho_N^s$$

and $$\text{sense}(\rho_i^u/\rho_i^s) = \text{sense}(\rho_i^u)/\rho_i^s - \rho_i^u \text{sense}(\rho_i^s)/(\rho_i^s \rho_i^s)$$

with $$\text{sense}(\rho_i^u) = \text{sense}(\Phi(P_i^j, \mu_i, \sigma_i))$$

and $$\text{sense}(\rho_i^s) = \text{sense}(\Phi(P_i^j, C_i, \sigma_i))$$

So, if the sensitivity of the standard function $\Phi$ can be calculated then the sensitivity of the failure probability F to either $\mu$ or $\sigma$ can also be calculated. The sensitivity of $\Phi$ with respect to $\mu$ or $\sigma$ can be calculated according to standard differentiation formulas.

Note that no additional simulations beyond those done during MIS's probability of fail calculation (steps 1-5) are required. Sensitivities to sets of variables that change together can be calculated by adding the sensitivities to the variables individually. For replicated components, sensitivities of parameters associated with designable parameters can be added to get the sensitivity of the overall probability of failure to those parameters.

Another embodiment provides an alternative means for calculating sensitivities mathematically without performing additional simulations beyond those done during MIS's probability of fail calculation (steps 1-5). In step 5, MIS calculates a probability of failure using the original "true" or unshifted distribution for the variable to which the sensitivity is being calculated. In this embodiment a second probability of failure is calculated using a second "true" distribution for the variable to which the sensitivity is being calculated. The latter true distribution is perturbed from the original true distribution. In the case of sensitivity to the mean, it is shifted. In the case of sensitivity sigma, it is broadened or narrowed.

To calculate the sensitivity, first steps 1-5 of MIS are carried out. Then step 5 is repeated with a substitution for $\rho_i^u$, where i corresponds to the parameter to which the sensitivity is being calculated. The substitution is termed $\rho_i^{u*}$. The substitution is done for each j, i.e., for each failing sample. To calculate sensitivity to the mean $\rho_i^{u*} = \Phi(P_i^j, \mu_i + \Delta\mu_i, \sigma_i)$. Step 5 is carried out with this substitution to calculate a second probability of failure, F*. Sensitivity of the probability of failure to $\mu_i$ is then $(F^* - F)/\Delta\mu_i$. To calculate sensitivity to sigma, $\rho_i^{u*} = \Phi(P_i^j, \mu_i \sigma_i + \Delta\sigma_i)$, step 5 is carried out to calculate F*, and sensitivity of the probability of failure to $\sigma_i$ is calculated as $(F^* - F)/\Delta\sigma_i$.

As in the previous embodiment, sensitivities to sets of variables that change together can be calculated by adding the sensitivities to the variables individually. For replicated components, sensitivities of parameters associated with designable parameters can be added to get the sensitivity of the overall probability of failure to those parameters.

Alternatively, in this embodiment, in the calculation of each $\theta^j$ in Step 5, perturbations to the "true" distributions for multiple variables can be done at once. For replicated components, $\rho_i^u$ is substituted with $\rho_i^{u*}$ for all i corresponding to the variable to which sensitivity is being calculated for all copies of the replicated component. With those substitutions made, F* is then calculated in the usual way as described in Step 5. The sensitivity to the parameter shared by the replicated components is then $(F^* - F)/\Delta\mu_i$ for sensitivity to mean and $(F^* - F)/\Delta\sigma_i$ for sensitivity to sigma, where the replicated components share the same mean and sigma, and perturbations, in their true or unshifted distributions.

Figure 7:
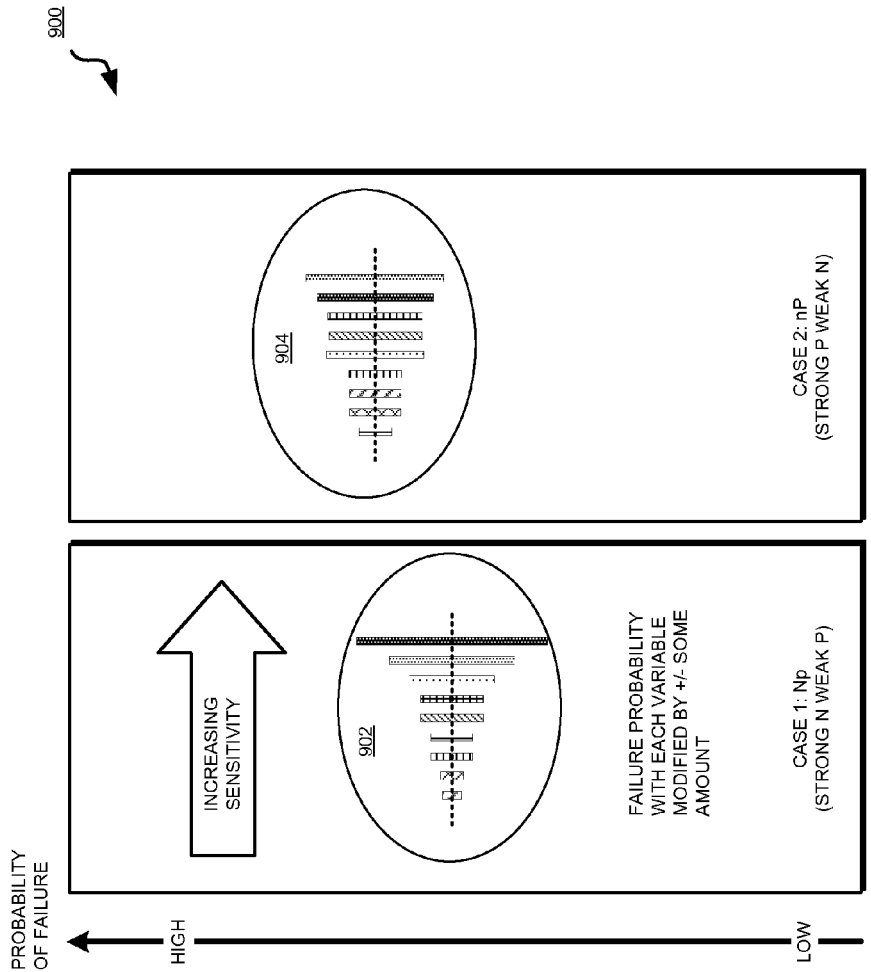
FIG. 7 depicts a graph showing the results of computing analytical sensitivities depicted in a manner suitable to guide the identification of the components associated with the sensitivities in accordance with an illustrative embodiment.

With reference to FIG. 7, this figure depicts a graph showing the results of computing analytical sensitivities depicted in a manner suitable to guide the identification of the components associated with the sensitivities in accordance with an illustrative embodiment. Results shown on graph 900 use the computed analytical sensitivities to determine a change in likelihood of failure when each variable is changed by a certain amount. Furthermore, for the ease of identifying a relative priority amongst the various components results are shown in order of magnitude of effect on likelihood of failure of the various associated components.

As an example, cluster 902 depicts the plot of the analytical sensitivity for several components in a sorted order. As is apparent from the depiction, a designer is guided to readily and easily identify the rightmost component as having the highest impact on the probability of failure for the computed fringe input cases (rare failure modes).

Cluster 904 depicts a similarly sorted plot of analytical sensitivities for providing similar guidance. Not only do the sorted plots identify a component contributing most to the likelihood of failure for certain computed input cases, plots of clusters 902 and 904 when considered together further guide the designer to select a component which affects all or some design corner cases. For example, while the rightmost component in a particular plot may have the highest contribution to the probability of failure at a given design corner, it may be the third (or x-th) component in the sorted plot whose probability of failure may exceed a threshold in all or some of the corners. Thus, using graph 900 as opposed to graph 500 in FIG. 4, a designer is guided to select a suitable component for manipulation for one or more design corners.

Note that for the embodiment described above which operates by perturbing the "true" or "unshifted" distributions, the probabilities of failure that define the position and extent of the lines shown in FIG. 7 can be calculated directly by assigning to $\Delta\mu_i$ or $\Delta\sigma_i$ the value of the change whose effects are to be depicted on the graphs without calculating sensitivities as $(F^* - F)/\Delta\mu_i$ or $(F^* - F)/\Delta\sigma_i$. In that case, F and F* can be used directly to define the line positions and extents on the plots. Fail probabilities for other values of the perturbations, $\Delta\mu_i$ or $\Delta\sigma_i$, can also be calculated and used to define the extent of lines or attributes of other plotting symbols.

Figure 8:
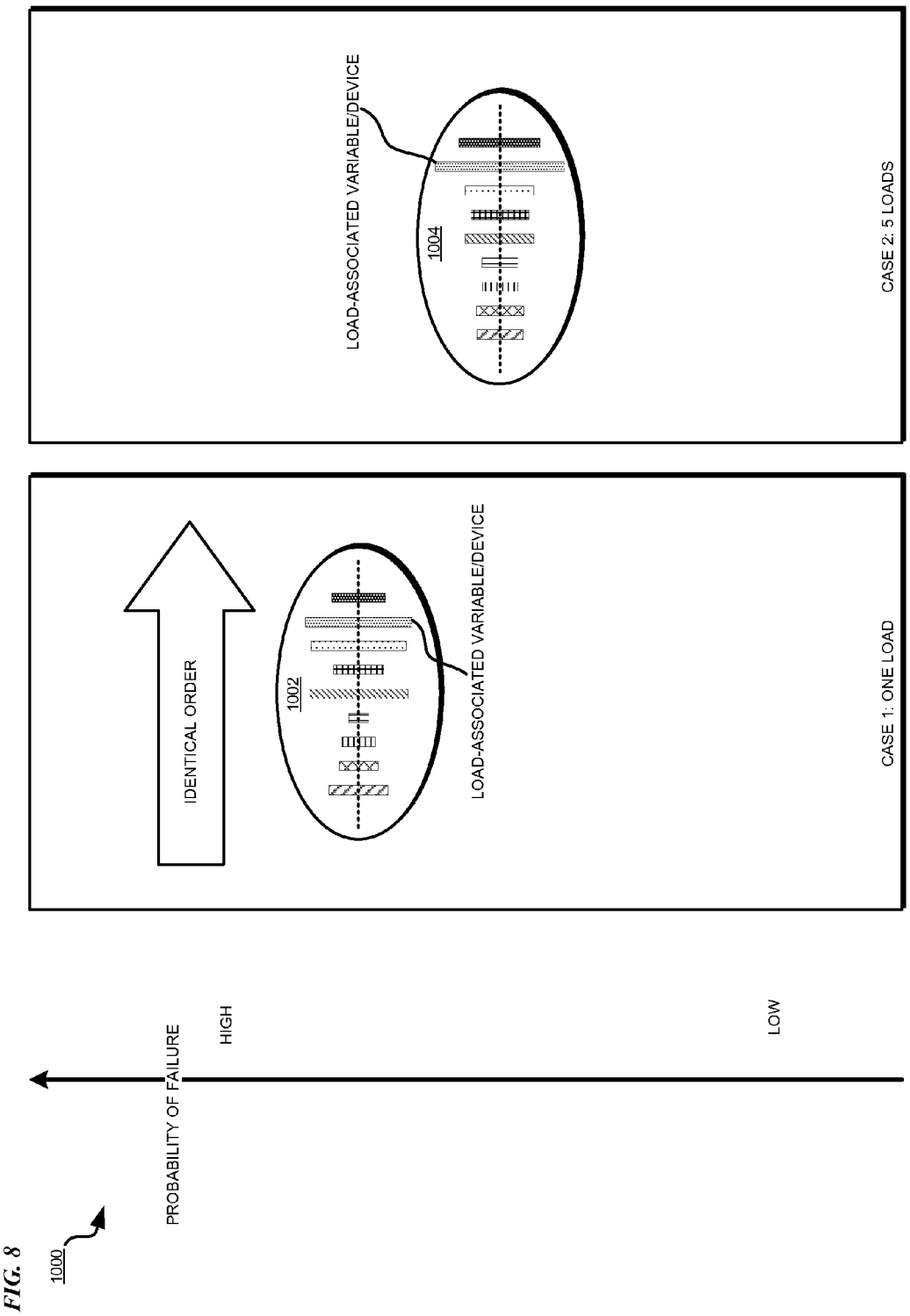
FIG. 8 depicts another example graph showing the results of computing analytical sensitivities depicted in a manner suitable to guide the identification of the components associated with the sensitivities in accordance with an illustrative embodiment.

With reference to FIG. 8, this figure depicts another example graph showing the results of computing analytical sensitivities depicted in a manner suitable to guide the identification of the components associated with the sensitivities in accordance with an illustrative embodiment. Graph 1000 comparatively plots the results of using the analytical sensitivities computed for two example variations of a circuit to demonstrate an improvement over graph 700 in FIG. 6. Results shown on graph 1000 use the computed analytical sensitivities to determine a change in likelihood of failure when each variable is changed by a certain amount.

Plot 1002 is a plot of the sensitivities of the components of an LCB driving a single latch as described with respect to FIG. 6. Plot 1004 is a plot of the sensitivities of the components of an LCB driving five replicas of latch circuit as described with respect to FIG. 6.

Again, for guiding a designer, plots 1002 and 1004 advantageously plot the analytical sensitivities of the various components in the same order in both configurations. In other words, the sensitivity of x-th component appears in the same position in plots 1002 and 1004 regardless of the replication.

As is evident from the depiction, a designer is readily able to identify the component having the highest effect on the probability of failure (or any particular selected effect on probability of failure) as that component is in the same position in both plots. Thus, a designer can be guided even if the analytical sensitivities of the same component in different design corners are comparatively of different magnitudes, it is the same component that is associated with the sensitivity in a similar manner, and should be modified to improve the probability of failure. Moreover, correct handling of variables associated with replicated components, as described here to provide a sensitivity of the probability of fail to variables associated with that component, allows the importance of the replicated component to be identified in FIG. 8, where it was obscured in FIG. 6.

With reference to FIG. 9, this figure depicts an example manner of visualizing sensitivity information in an IC design in accordance with an illustrative embodiment. Design 1100 is a greatly simplified schematic of an example IC circuit. Visualization 1102 and 1104 are shaped and shaded differently to indicate different sensitivities, different values of the same sensitivity, or a combination thereof.

Furthermore, visualization 1102 and 1104 include additional visual artifacts such arrows. In the depicted example, arrow 1106 in visualization 1102 as shown may indicate to a designer that the affected component, e.g., a transistor, has to be sized up to improve a metric against one sensitivity. A more detailed description of the visualization aspect of the guidance provided to the designer is described in a related disclosure incorporated herein by reference.

The flowchart and block diagrams in the described Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method is provided in the illustrative embodiments for guiding design change actions based on sensitivities computed with no additional simulations beyond those used by MIS to calculate a probability of failure for certain failure modes in complex circuits. Using an embodiment of the invention, the simulation techniques for determining sensitivities can be extended to more complex circuits than memory cells. Furthermore, for rare sensitivities from input cases that lie in the tails of the input distribution, an embodiment avoids having to re-execute a simulation. An embodiment analytically computes the sensitivities for certain input cases, thus making the determination of such sensitivities computationally more efficient than an input-change method of simulation.

The embodiment receives a probability of failure using a simulation method. The embodiment calculates a probability of failure for the circuit based on simulation results. The embodiment calculates sensitivities of the probability of failure to one or more variables that were varied in the simulation. A sensitivity is a change in one value in response to another value, particularly, a change in the probability of failure in response to a change in a variable that was varied during the simulation.

In one embodiment, the circuit corresponds to a part of the IC design. In one embodiment, the variable is a feature of a component in the circuit. A component, e.g., a transistor, can have more than one variable associated there with. For example, a transistor can have a length and a width varied in the simulations. In another embodiment, the variable could also be an operating condition of the component, for example, the temperature to which a transistor is exposed, or the supply voltage that the transistor receives.

An embodiment receives the sensitivities for a number of variables. The embodiment presents the sensitivities to a designer in such a way that the designer is guided to make a change to one or more components in order to decrease the probability of failure of the circuit.

One embodiment presents the sensitivities by depicting a relationship between a sensitivity and the corresponding variable. Because the corresponding variable is associated with the component, the depiction presents a relationship between the sensitivity and the associated component.

A sensitivity is a positive or a negative number that represents the change in the probability of failure responsive to a change in the variable.

Another embodiment presents the sensitivities by starting with the original probability of failure received from the simulation and then calculating the probabilities of failure for one or more other values of each variable using the sensitivities that are estimated without additional simulations.

As an example, because sensitivity represents a change in a probability of failure responsive to a change in a value of a variable, an embodiment can select a change in the values of the variables and calculate the new probabilities of failure for that change. The sensitivities can then be depicted indirectly, for example, by drawing a line between two or more probabilities of failure that were calculated for two or more values of a variable. The depiction provides a representation of the sensitivities as the sensitivities are associated with the variable, which in turns indicates a relationship between the sensitivities and the component.

A designer using an embodiment can then take into account the feasibility of changing a parameter of the component. For example, the designer may determine whether sufficient space is available in the IC design layout to make a particular change. As another example, the designer may determine an effect of a change in one component on aspects other than the probability of failure of the circuit.

In one embodiment, some variables correspond to designable parameters of replicated components. Calculating the sensitivity of failure to those parameters according to an embodiment guides the changes a designer can make to the replicas. Thus, an embodiment provides an improvement over using a Center of Gravity (CoG) as an indicator of sensitivity. When calculating a CoG, the parameters vary independently, which accurately represents the situation in a manufactured circuit, but does not account for the impact on the probability of failure of the changes the designer can make to the replicated component.

The depiction of sensitivity information in the manner of sorted graphs of FIGS. 7 and 8, and in the visual rendering on the design schematic in the manner of FIG. 9 may guide appropriate modification of the design in a more systematic and efficient manner.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for guiding design actions for complex failure modes in an integrated circuit (IC) design, the method comprising:
   receiving a probability of failure estimate of a circuit according to the IC design, the probability being determined using a simulation;
   computing, in an application executing using a processor, a sensitivity of the probability of failure to a variable associated with a component in the circuit, wherein the sensitivity is determined by performing an estimation without performing the simulation; and
   depicting the sensitivity relative to the component in the IC design such that the sensitivity is associated with the component and a visual relationship between the component and the sensitivity of the probability of failure to the variable associated with the component is usable for adjusting a characteristic of the component to reduce the probability of failure of the circuit.

2. The method of claim 1, wherein the variable is one of a set of variables associated with the component, wherein the variable is assigned different values in the simulation, and wherein the sensitivity corresponds to a change in the probability of failure responsive to a change in a value of the variable associated with the component.

3. The method of claim 1, wherein the variable is a feature of the component.

4. The method of claim 1, wherein the variable is an operating condition of the component.

5. The method of claim 1, wherein the depicting further comprises: plotting a plurality of probabilities of failure, wherein a difference between two probabilities of failure in the plurality of probabilities of failure corresponds to the sensitivity.

6. The method of claim 1, wherein the component is a plurality of replicas of the component, wherein the variable corresponds to a designable parameter of the plurality of replicas of the component, and wherein the sensitivity enables adjusting the characteristic associated with each replica of the component.

7. The method of claim 1, wherein the circuit corresponds to a portion of the IC design.

* * * * *

UNITED STATES PATENT AND TRADEMARK OFFICE
CERTIFICATE OF CORRECTION

PATENT NO. : 8,595,665 B2  Page 1 of 1
APPLICATION NO. : 13/460369
DATED : November 26, 2013
INVENTOR(S) : Gattiker et al.

It is certified that error appears in the above-identified patent and that said Letters Patent is hereby corrected as shown below:

On the title page item [75], delete "Ann" and should read --Anne Elizabeth Gattiker--

Signed and Sealed this
Seventeenth Day of May, 2016

Michelle K. Lee
*Director of the United States Patent and Trademark Office*